United States Patent Office 3,842,073
Patented Oct. 15, 1974

3,842,073
RACEMIZATION PROCESS FOR ALPHA-AMINO-CAPROLACTAM AND LYSINE AMIDE
Robert Fuhrmann, Morris Plains, Fred W. Koff, Clifton, and Stylianos Sifniades, Parsippany, N.J., assignors to Allied Chemical Corporation, New York, N.Y.
No Drawing. Continuation of abandoned application Ser. No. 165,379, July 22, 1971. This application Apr. 5, 1973, Ser. No. 348,366
Int. Cl. C07c *103/118;* C07d *53/06*
U.S. Cl. 260—239.3 R
7 Claims

ABSTRACT OF THE DISCLOSURE

Anhydrous ammonia is employed as a racemization solvent for optically active α-amino lactams and amino acid amides. Concentrated solutions can be obtained and the solvent can be readily removed from the product for recycle.

---

This is a continuation of application Ser. No. 165,379, filed July 22, 1971, now abandoned.

This invention relates to the racemization of optically active amides of amino acids and aminolactams. More particularly, this invention relates to an improved process for the racemization of optically active amides of amino acids and aminolactams in the presence of a strong base.

BACKGROUND OF THE INVENTION

It is known that the racemization of optically-active aminolactams and amides of amino acids can be carried out in the presence of sodium by distillation in the absence of a solvent under vacuum at elevated temperatures, e.g., 180 to 190° C. This process has the disadvantage that high temperatures must be employed and only about 70% recovery is obtainable, greatly adding to the expense of such process. Racemization of aminolactams by heating with sodium hydroxide in the presence of organic solvents, such as toluene and other hydrocarbons, is also known, and is disclosed in U.S. Pat. 3,105,067. This process has the disadvantage that the comparatively high boiling point of the solvent makes it difficult to obtain a solvent-free product and adds to the heat requirements needed to recover the solvent for recycle. These add greatly both to the capital investment and the operating costs of such process.

SUMMARY OF THE INVENTION

It is an object of the present invention to provide an improved process for racemization of amides of amino acids and aminolactams.

It is another object to provide a racemization solvent for amides of amino acids and aminolactams of high solubilizing ability and low boiling point which can be readily recovered for recycle.

Further objects will become apparent from the following detailed description thereof.

It has been discovered that optically active amides of amino acids and aminolactams can be racemized in the presence of a strong anhydrous base in an anhydrous ammonia solvent.

DETAILED DESCRIPTION OF THE INVENTION

The process of the invention is of particular interest for the racemization of lysine amide and α-aminocaprolactam. Either the D or L optically active forms can be employed as starting materials in the present process.

Strong bases suitable for use in the invention include the alkali and alkaline earth metal salts including their hydroxides, such as potassium hydroxide, sodium hydroxide and the like; carbonates, such as sodium carbonate, calcium carbonate and the like; oxides, such as calcium oxide, magnesium oxide and the like; amides, such as sodium amide, lithium amide and the like; alcoholates such as sodium methoxide, potassium ethoxide and the like; and quaternary ammonium compounds, such as tetrabutyl ammonium hydroxide, tetraisopropyl ammonium hydroxide and the like. The amount of base employed is not critical, however generally from about 0.2 to about 4% by weight of the starting material of the base will be employed.

The amount of the anhydrous ammonia employed in the present process is not critical. However excellent results are obtained in concentrated solutions containing up to about 40% by weight of the amide of the amino acid or aminolactam starting material at room temperature. Generally from about 1 to 40% by weight solutions can be employed, and preferably from about 10 to 30% by weight of the amide of the amino acid or aminolactam in ammonia will be employed.

The temperature of reaction can range up to the decomposition temperature of the starting materials, but generally temperatures from about 50° C. up to about 200° C. will be suitable. Preferred temperatures of 75 to 140° C. are generally employed. The time required for reaction will vary but is readily determinable by one skilled in the art and will depend on the amino acid amide or aminolactam starting material to be racemized, the temperature of reaction, and the concentrations of the starting material and of the catalyst in ammonia. Under optimum conditions periods up to about 10 hours will be adequate for complete racemization.

The invention will be further illustrated by the following examples, but it is meant to be understood that the invention is not to be limited to the details disclosed therein. In the examples, percentages and parts are by weight.

Thin layer chromatograms were developed using as solvent 25 parts by glyme to 6 parts of concentrated aqueous ammonia. The chromatograms were visualized with UV light and Ninhydrin.

The degree of racemization was determined by comparing the optical rotation, measured in a 1 N hydrochloric acid solution of the racemized product, with the known value for the fully resolved amino acid amide or aminolactam.

EXAMPLE 1

Into a Paar-type reactor fitted with a stirrer were charged 0.505 part of L-lysineamide and 0.030 part of sodium amide. The reactor was cooled to about −20° C. by a Dry Ice-acetone bath and 13.1 parts of anhydrous ammonia were added. The reactor was then immersed in an oil bath maintained at 100° C. and reaction continued for 8 hours while stirring. The reactor was then cooled, vented and the product collected. The reactor was rinsed with 1 N aqueous hydrochloric acid and the combined solutions filtered.

The product had a $[\alpha]_D^{20}$ of +4.16. $[\alpha]_D^{20}$ for L-lysineamide is +18.6, indicating 22.3% optical activity and that about 78% racemization had occurred. Only a single spot was obtained on a thin layer chromatogram.

EXAMPLES 2–4

The procedure of Example 1 was followed except that different catalysts, reaction temperatures and concentrations were employed. The reaction conditions and results are summarized in Table I below.

TABLE I

| Example number | 2 | 3 | 4 |
|---|---|---|---|
| Charge (parts): | | | |
| L-lysineamide | 0.502 | 0.5606 | 1.0053 |
| Sodium amide | 0.033 | | |
| sodium hydroxide | | 0.020 | 0.040 |
| anhydrous ammonia | 15.5 | 15.0 | 5.0 |
| Conditions: | | | |
| Temperature, °C | 110 | 100 | 100 |
| Reaction time, hours | 8.0 | 8.0 | 8.0 |
| Percent concentration | 3.13 | 3.22 | 16.67 |
| Optical activity of product, $[\alpha]_D^{20}$ | +3.18 | +0.4 | +1.6 |
| Percent racemization | 83 | 98 | 91 |
| Thin layer chromatogram, spots | | 1 | 1 |

EXAMPLE 5

Into a glass-lined autoclave fitted with a stirrer were charged 0.9986 part of L-α-aminocaprolactam and 0.026 part of sodium methoxide. The autoclave was sealed, flushed with nitrogen, cooled to −60° C. and five parts of ammonia were added. The reactor was immersed in an oil bath maintained at 100° C.±5° C. and reaction continued for four hours while stirring. The reactor was then cooled to about 60° C., the ammonia distilled off and the product collected.

The product had a $[\alpha]_D^{25}$ of +0.25. $[\alpha]_D^{25}$ for L-α-aminocaprolactam is −34.0, indicating that about 100% racemization had occurred. Only a single spot was obtained on a thin layer chromatogram.

EXAMPLES 6–9

The general procedure of Example 5 was followed except varying the catalyst, concentration and reaction time. Reaction conditions and results are summarized in Table II below.

TABLE II

| Example number | 6 | 7 | 8 | 9 |
|---|---|---|---|---|
| Charge (parts): | | | | |
| L-α-aminocaprolactam | 1.0253 | 1.0000 | 1.0186 | 1.0038 |
| Sodium hydroxide | 0.028 | 0.017 | 0.006 | 0.0047 |
| Anhydrous ammonia | 5.8 | 6.0 | 6.0 | 6.0 |
| Conditions: | | | | |
| Reaction time, hours | 4 | 4 | 4 | 2 |
| Percent concentration | 15.0 | 14.3 | 14.3 | 14.3 |
| Optical activity of product | −0.49 | 0.00 | 0.00 | −7.26 |
| Percent racemization | 99 | 100 | 100 | 79 |
| Thin layer chromatogram, spots | [1]1 | | [1]1 | |

[1] Trace of lysine.

EXAMPLE 10

This example is given for purposes of comparison to show that the presence of a base other than the ammonia solvent is required for racemization.

The procedure of Example 5 was followed charging 1.1186 parts of L-α-aminocaprolactam, and 5.8 parts of ammonia and reacting for four hours at 100° C.

The product had an $[\alpha]_D^{25}$ of −33.2 indicating that little, if any, racemization had taken place.

We claim:

1. In a method for the racemization of optically active material of the group consisting of α-aminocaprolactam and lysine amide and mixtures thereof by heating in the presence of a strong base, the improvement which comprises employing anhydrous ammonia as solvent and heating said material in solution therein at concentration of at least 10 percent by weight.

2. A method according to claim 1 wherein the temperature is maintained between about 75 and about 140° C.

3. A method according to claim 2 wherein the starting material is α-aminocaprolactam.

4. A method according to claim 2 wherein the starting material is lysine amide.

5. A method according to claim 2 wherein from 0.2 to 4% by weight of the starting material of the strong base is employed.

6. In a method for the racemization of optically active α-aminocaprolactam or lysineamide by heating in the presence of a strong base, the improvement which comprises dissolving the starting material in anhydrous ammonia in concentration of from 10 to 40 percent by weight of the solvent and maintaining the temperature between about 50° C. and about 200° C.

7. A method according to claim 5 wherein the strong base is sodium hydroxide.

References Cited

UNITED STATES PATENTS

| 3,024,231 | 3/1962 | Scherrer | 260—239.3 R |
| 3,105,067 | 9/1963 | Nelemans et al. | 260—239.3 R |
| 3,692,775 | 9/1972 | Kubanek et al. | 260—239.3 R |

OTHER REFERENCES

Audrieth et al.: "Non-Aqueous Solvents," (Wiley) (1953), pp. 43–48.

JOHN D. RANDOLPH, Primary Examiner

R. T. BOND, Assistant Examiner

U.S. Cl. X.R.

260—561 A

PO-1050
(5/69)

UNITED STATES PATENT OFFICE
CERTIFICATE OF CORRECTION

Patent No. 3,842,073                    Dated  October 15, 1974

Inventor(s) R. Fuhrmann, F. W. Koff and S. Sifniades

It is certified that error appears in the above-identified patent and that said Letters Patent are hereby corrected as shown below:

Column 2, line 41 "by" should read -- of --.

Column 4, claim 6, line 5, "10 to 40" should read -- 10 to 30 --.

Signed and Sealed this twenty-third Day of March 1976

[SEAL]

Attest:

RUTH C. MASON
Attesting Officer

C. MARSHALL DANN
Commissioner of Patents and Trademarks